United States Patent Office 3,461,732
Patented Aug. 19, 1969

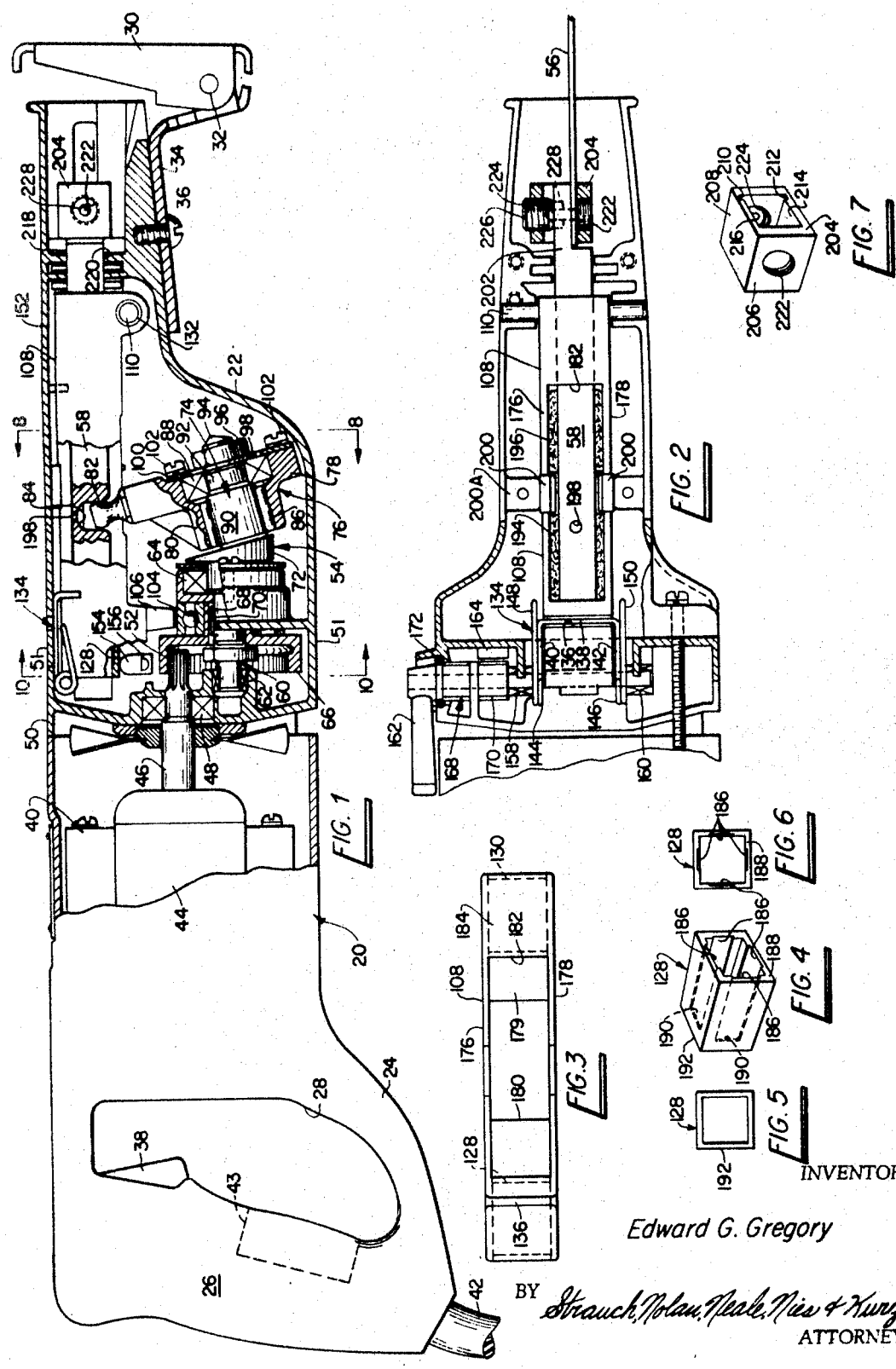

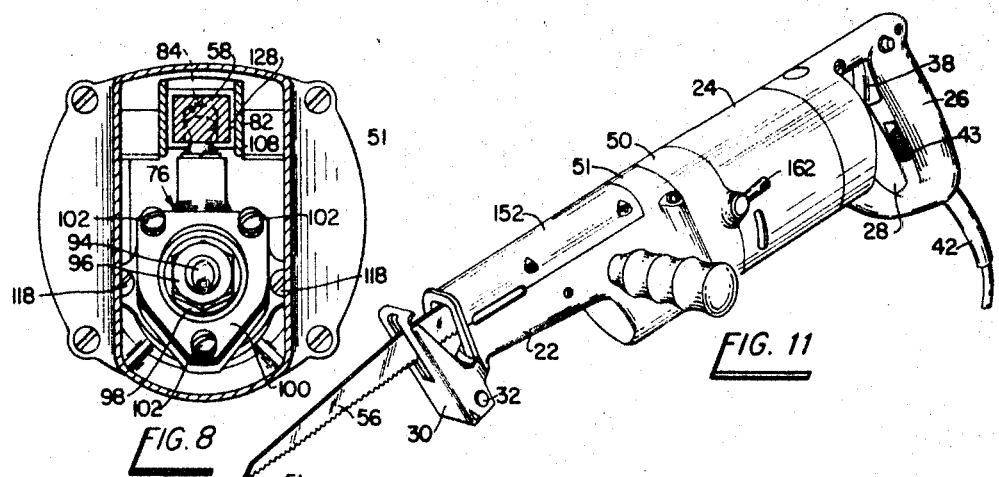
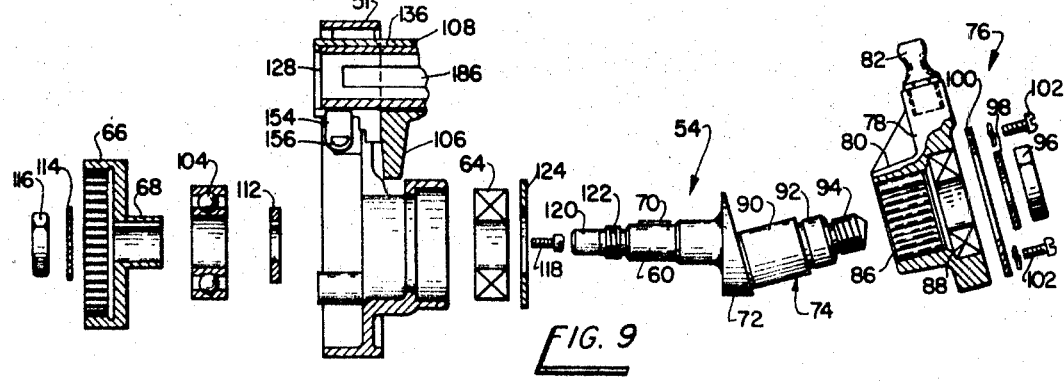
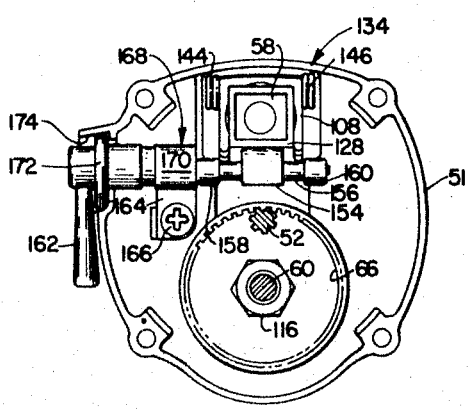

3,461,732
PORTABLE POWER DRIVEN RECIPROCATING SAW
Edward G. Gregory, North Syracuse, N.Y., assignor to Rockwell Manufacturing Company, Pittsburgh, Pa., a corporation of Pennsylvania
Filed Dec. 19, 1966, Ser. No. 602,696
Int. Cl. F16h *33/20;* B27b *11/00*
U.S. Cl. 74—60                                     10 Claims

ABSTRACT OF THE DISCLOSURE

A reciprocating hand held saw having a motor and drive mechanism for selectively imparting straight axial reciprocation to the saw blade or aggressive orbital reciprocation to the saw blade.

---

This invention pertains to improvements in hand held, electric motor driven so-called "all purpose" reciprocating saws, primarily those which are capable of selective rectilinear or orbital cutting action, to attain improved cutting results on different materials.

Orbital or similar aggressive cutting actions are not uncommon in portable electric saws of the type in which the reciprocating blade action is effected at right angles to the axis of the case and motor. Such saws are variously referred to as "jig," "bayonet" and "saber" saws. In at least two prior United States patents on such, Stelljes et al., No. 3,095,748, of July 2, 1963, for "Orbital Motion Tool" and in Papworth, No. 2,775,272, of December 25, 1956 for "Portable Power Driven Reciprocable Cutting Tool," the cutting action may be selectively shifted between aggressive and straight reciprocating actions. These saws are quite limited in their utility due to the relation of the saw blade location to the base plate and the motor and drive train precluding their use for many purposes because the blade will not reach to the location where the cut must be made.

In "all purpose" saws of the type disclosed herein, the blade projects from one end of the unit and the cutting action is generally axially of the tool and motor axis rather than perpendicular thereto as in bayonet saws. In most of such all purpose saws, only rectilinear cutting action is employed. Examples of the latter type of saws will be found in United States patents to Thomas, No. 1,679,884 of Aug. 7, 1928, entitled "Attachment for Drills"; to Schultz, No. 2,722,244 of Nov. 1, 1955, entitled "Blade Clamp for Reciprocating Saw"; and Ristow et al., No. 2,824,455 of Feb. 25, 1958, for "Portable Reciprocating Saw." United States patent, Papworth, No. 2,705,980 of Apr. 22, 1955 for a "Portable Power Driven Reciprocating and Oscillating Cutting Tool" discloses a reciprocating saw, movable longitudinally of its casing and driving motor, in a linear and slightly oscillating motion. There is however no selectivity between aggressive and reciprocating action in any of these prior all purpose saws.

The saw of the present invention provides for the first time a truly all purpose saw in that it provides rapid but safe blade interchangeability, blade cutting motion selectivity and in its preferred form blade speed selectivity to accommodate different materials and cutting conditions.

It is a basic object of this invention therefore to provide a portable saw of the type in which the blade reciprocates in a path generally parallel to the axis of its driving motor which may be selectively adjusted to provide either aggressive or pure reciprocating cutting actions and preferably which also includes means for varying the speed of reciprocation of the saw blade.

A further object of the invention is to provide an improved saw mounting and guiding structure and a power drive to attain compound reciprocating and orbital action of the saw.

A further object of the invention is to provide an externally operable control means, whereby the aforesaid orbital action may be suppressed without interference with linear reciprocating motion of the tool.

A still further object of the invention is to provide an improved rotary to reciprocating linear motion converting mechanism.

Another and further object is to provide improved lubricating means in connection with the saw blade carrier and guiding means therefor.

Still another object of this invention is to provide an improved clamp means for firmly attaching saw blades of various cross-sections to a saw blade supporting reciprocating carrier.

The above and other objects of the invention will become more fully apparent from the appended claims and from the following description as it proceeds in connection with the drawings which show the essential organization and components pertaining thereto, and in which:

FIGURE 1 is a part elevation and part sectional view of the tool assembly with saw blade omitted;
FIGURE 2 is a plan view of the front part of the tool, with top of casing removed;
FIGURE 3 is a top view of the tool carrier guide;
FIGURE 4 is a perspective view of a tool carrier guide bushing;
FIGURE 5 is one end view of said bushing;
FIGURE 6 is an opposite end view thereof;
FIGURE 7 is a perspective view of a saw blade to carrier clamping means;
FIGURE 8 is a sectional view along line 8—8 of FIGURE 1;
FIGURE 9 is an exploded partly sectionalized view of the orbital driven assembly;
FIGURE 10 is a sectional view along line 10—10 of FIGURE 1; and
FIGURE 11 is a perspective view of the tool.

Referring to FIGURE 1 which gives an overall, partially sectionalized view of the invention, the hand tool as a whole is encased in a multipart composite case 20, the right hand part 22 (as viewed in FIGURE 1) of which is sectioned to show the interior construction, and the left hand part 24 of which has a handle 26 at one end defined by finger opening 28. A work engaging guide shoe 30 is pivoted at 32 upon a bracket 34 fixed to part 22 by screw 36. A switch trigger 38 on handle 26 is provided to control power supply to electric motor 40 via cord 42.

Motor 40 is a two speed A.C.-D.C. heavy duty motor. In its preferred form it provides either 1900 or 2800 saw strokes per minute depending on the speed selected. If desired, a continuously variable sped motor could be provided but it has been found that with two speeds available and selectivity between straight reciprocating and orbital motion, the saw of this invention may be used for substantially any sawing purpose desired. A two position switch 43 on the handle 26 below trigger 38 is connected to provide the motor speed selectivity desired.

The rotor 44 of motor 40 is equipped with a shaft 46 journalled by an antifriction bearing 48 at its right end, and a similar bearing (not shown) at the left end on central casing part 50 and casing part 24 respectively. The rightmost end of shaft 46 comprises a pinion 52 which drives a tool driving assembly generally designated 54. The cutting tool, such as saw blade 56 (FIGURE 2) is mounted on a reciprocably mounted tool carrier 58 (FIGURE 2) within casing part 22 and protrudes from the right end of the casing part 22 through guide shoe 30 (FIGURE 1).

As shown in FIGURES 1 and 9, tool driving assembly 54 includes a spindle 60 journalled by bearings 62 and 64 on casing parts 50 and 22 respectively. An internal ring gear 66 which has an integral eccentric hub 68 (see also FIGURE 9) is fixed for rotation with spindle 60 by key 70.

Integral with the right hand end of spindle 60 is a wedge shaped disc 72 from which extends at an angle a crank pin 74 which latter serves as a journal for a wobble plate structure generally designated 76. Bearings 62 and 64 journal spindle 60 for rotation about an axis parallel to the axis of shaft 46. The axis of crank pin 74 intersects the axis of spindle 60 and is inclined thereto at an angle of about 15°.

Wobble plate 76 consists of a flat plate 78 normal to the axis of pin 74 and having a long hub 80 for broad based mounting on crank pin 74. A power transmitting knob 82 extends from plate 78 and cooperates with a socket 84 in tool carrier 58, as will be explained below, to impart reciprocation thereto in response to rotation of spindle 60. The wobble plate 76 is journalled on crank pin 74 by a needle bearing 86 and a ball bearing 88. As will be observed in FIGURE 1, crank pin 74 has coaxial portions 90, 92 and 94 of three different diameters, diminishing from the end adjacent plate 74 (at its base) to its opposite end. The portions 90 and 92 of larger diameter serve as a support for the hub portion 80 of the wobble plate 76 and constitute the seats for needle bearings 86 and ball bearing 88 respectively. The portion 94 of the crank pin 74 is threaded to receive retaining nut 96 which, through washer 98, engages the inner race of ball bearing 88, to maintain the entire wobble plate 76 in assembly on the crank pin 74. The outer race of ball bearing 88 is retained within the recess of plate 76 in which it is seated by a flat retaining element 100 fastened to said plate by screws 102 (see FIGURE 8).

A ball bearing 104 is seated on the eccentric hub 68 of ring gear 66 and through its outer race serves to transmit camming action of eccentric hub 68 to a follower 106 depending from a tool carrier guide 108 (described below) which is pivotally mounted at its forward end on casing part 22 by a pivot pin 110 and which reciprocably mounts carrier 58.

As is apparent from FIGURE 9, in addition to the elements referred to above, assembly 54 comprises spacer 112, washer 114, nut 116, screws 118 (FIGURE 8) journal portion 120 of spindle 60 and threaded portion 122 thereon and retainer plate 124. Assembly 54 is brought together by passing spindle 60 through plate 124 and ball bearing 64 and seating the latter within casing part 51. With spindle 60 extending to the left of casing part 51, spacer 112, is slipped over it against the inner race of bearing 64; ball bearing 104 is seated on eccentric hub 68 of ring gear 66 and the latter is then moved in position on spindle 60 where it is keyed by key 70. Next washer 114 is placed over the spindle 60 against the interior wall of gear 66 and nut 116 is tightened in place on threaded portion 122. Plate 124 lying just to the right of ball bearing 64 is then fastened to the casing part 51 by screws 118 (FIGURE 8).

Referring again to FIGURE 1, it will be understood that when spindle 60 and the elements fixed thereon are rotated by the motor 40, eccentric crank pin 90 will rotate bodily with them about the axis of spindle 60 and bearings 62 and 64. However, the wobble plate assembly 76, being constrained against rotation due to the engagement of its knob 82 with socket 84 in tool carrier 58 will receive fore and aft pivotal oscillation as the result of rotation of spindle 60, which will impart fore and aft reciprocating motion to the tool carrier 58.

Tool carrier 58 is guided for reciprocation by the carrier guide 108 (FIGURES 1 and 3) which is pivoted on casing part 22 at 110. Carrier guide 108 is a die cast part of generally elongated rectangular configuration, and of hollow square cross-section. It has fixed therein bronze bearings 128 and 130 (each of the form shown in FIGURES 4-6) of corresponding cross-section at each end. The tool carrier 58 is axially slidably mounted within the carrier guide 108 by the bearings 128 and 130. Tool carrier guide 108 is provided with a bushing 132 at the right end thereof (FIGURE 1) which receives pivot pin 110 fixed in the casing part 22 (FIGURE 1). As will become apparent presently, this pivotal mounting of guide 108 permits pivotal oscillation of the guide 108 by motor driven eccentric hub 68, described above, through the intermediary of ball bearing 104.

The tool carrier guide 108, at its end opposite pivot 110, is equipped with a depending extension 106 which forms a follower bearing against the periphery of the outer race of ball bearing 104. A compressed spring 134 bears upon the top of the guide 108 in seat 136 (FIGURE 2), substantially opposite follower 106, to bias the left end of said guide 108 towards the eccentric hub 68 and bearing 104. As is apparent from a comparison of FIGURES 1, 2 and 10, spring 134 is a single piece of wire formed with a central transverse bar 138, rearwardly extending arms 140 and 142, coils 144 and 146 and forwardly extending arms 148 and 150. Bar 138 is seated in seat 136. The forward ends of arms 148 and 150 bear against the removable top 152 of casing part 22.

Eccentrically mounted bearing 104 and crank pin 74 being driven together by rotation of spindle 60, tool carrier guide 108 and tool carrier 58 within it will be oscillated up and down about pin 110, while wobble plate 76 will reciprocate the tool carrier 58 fore and aft within the guide. The combined motion of the tool carrier 58 will result in a generally orbital cutting action of blade 56 (FIGURE 2) attached to the latter. Specifically, when the tool carrier is pulled to the left as viewed in FIGURE 1, during the cutting stroke, carrier guide 108 will be pivoted clockwise about pin 110 by eccentric hub 68. During the return stroke when carrier 58 moves to the right in FIGURE 1, spring 134 will restore carrier guide 108 in a counterclockwise direction about pivot pin 110 thus giving an aggressive blade motion during the cutting stroke and relief during the return stroke of blade 56.

To convert the cutting action from orbital to rectilinear, it is necessary to disable oscillating action of the tool carrier guide about pivot 110. This is accomplished by a pivotally mounted locking cam 154 located substantially under the rear end (left—FIGURES 1 and 2) of the carrier guide 108.

As seen in FIGURE 1, the rear bottom wall of tool carrier guide 108 terminates immediately behind depending portion 106 to expose the bottom of bushing 128 for coaction with the cam 154.

Cam 154 is fixed to a shaft 156 which (as is shown in FIGURE 10) is mounted in suitable bearings 158 and 160 formed on the casing part 51, and which extends through one side thereof. A handle 162 is attached to the externally projecting end of shaft 156 and is used to shift the shaft 156 and cam 154 through an angle of 90° between limit positions established by projections on the casing part 51 disposed in the path of handle 162. In the limit position shown in FIGURES 1 and 10, cam 154 exhibits a high face to the bottom of tool carrier bearing 128 in guide carrier 108 preventing it from following eccentric hub 68 and bearing 104 (which are at their highest rise in FIGURE 1) under bias of spring 134. This gives purely reciprocating motion of carrier 58 and blade 56 and is used primarily for metal cutting or for wood cutting when surface chipping is a problem. However, when handle 162 is turned so as to adjust shaft 156 and cam 154 90° clockwise as viewed in FIGURE 1, a low face of the cam will be presented, allowing the rear end of the carrier guide 108 to descend under the influence of spring 134 and to follow eccentric hub 68 and bearing 104 through its depending follower 106. In this position, the blade 56 has the above described orbiting action used primarily for wood cutting.

Cam 154, shaft 156 and selector lever or handle 162 are retained in the selected position by a detent leaf spring 164 (FIGURE 10) fixed at one end by a screw 166 to casing part 51 and a sleeve 168 fixed to shaft 156 and having a portion 170 of square external cross-section against which spring 164 bears. Sleeve 168 is embraced by an O-ring 172 seated in recess 174 to prevent loss of lubricant from the casing and to prevent contamination along shaft 156 and sleeve 168.

Suitable indicia such as the words "wood" and "metal" are embossed in the casing adjacent the limit positions of lever 162 to indicate the position of lever 162 for orbital and reciprocating cutting actions respectively.

As pointed out above in reference to FIGURES 1, 2 and 3, the tool carrier is of rectangular cross-section and is guided within rectangular bushings 128 and 130 fixed in the opposite ends of the carrier guide 108. The guide 108 has continuous side walls 176 and 178 but is partly open on its bottom 179 as indicated at 180 (in FIGURE 3) to permit the wobble plate knob 82 to pass and oscillate therethrough while in engagement with socket 84. There is a larger opening 182 (FIGURE 2 and 3) in the top 184 of the guide which serves to provide access for packing and lubrication of the tool carrier 58.

The bushings 128 and 130 of the guide carrier 108 are each constructed as shown in FIGURES 4–6 for bushing 128. Each of the four interior walls is provided with a flat axially elongated recess 186 extending from the end 188 of the bushings 128 or 130 adjacent the center of the guide 108 to a position 190 just short of the opposite end 192. These elongated recesses are designed to permit lubricant to pass to the remaining bearing surfaces of the bushings 128 and 130 which are limited largely to the corners of the bushings, through most of the length thereof. By terminating the flat recesses at 190 short of the outer end 192 of the bushings 128 and 130 escape of lubricant drawn into the recesses for the opposite ends of carrier guide 108 is largely prevented.

The lubricant to the tool carrier 58 and the aforesaid bushings 128 and 130, as well as to socket 84 (cooperating with wobble knob 82) is provided by U-shaped strips 194 and 196 (FIGURE 2) of packing felt or the like through the apertured ends of which the carrier 58 projects and the sides of which are inserted in the space between the walls 176 and 178 of the guide 108 and the carrier 58, alongside the latter, and in between the two bushings 128 and 130. Additional felt lubricant packing material is extended over the top of the tool carrier 58 to supply lubricant, in a horizontal plane as well as to socket 84 via hole 198 (FIGURES 1 and 2) extending upwardly therefrom. Thin metal clips 200 are utilized to hold the packing strips in place. Another important function of the clips 200 is their use as wear plates and spring stabilizing members for the carrier assembly. These clips bear against bosses 200A cast in the casing part 22 and act as replaceable wearing surfaces. Thus the lubricant picked up by the tool carrier 58 off the felts 194 and 196, as it reciprocates, is carried to the bushings 128 and 130, with the unrecessed end portions thereof (FIGURE 5) serving to prevent extrusion and loss of lubricant from the ends of the carrier guide 108.

A further significant aspect of this invention resides in the novel clamping means for attaching cutting blades of different widths and thicknesses to the end 202 of carrier 58. As will be seen in FIGURE 2, the end 202 is reduced to approximately half the width of the remainder of tool carrier 58, in order that the reaction of blade 56 is centrally delivered to the carrier 58. A clamping means is in the form of an open ended cube 204 (FIGURE 7), opposed sides 206 and 208 of which being adapted to receive different sizes of saw blades. As shown in FIGURE 7, side 206 is adapted to receive blades up to the full height of the side between bottom 214 and top 216. Side 208, on the other hand, is provided with additional slots 210 and 212 for accommodating larger blades. Surfaces 214 and 216 are parallel and spaced apart a distance providing a sliding fit with the surfaces 218 and 220 (FIGURE 1) of the tool carrier 58. Sides 206 and 208 are drilled and threaded at 222 and 224 (FIGURE 7) to receive a centrally apertured clamping screw 226 (FIGURE 2). A blade, once chosen, is inserted into cube 204 and the two placed on the end of tool carrier 58. Screw 226 is threaded in the opposite wall in the manner shown in FIGURE 2. A dowel 228 which is fixed as shown on end 202, extends through a hole provided in the saw blade 56, retaining it in position on the carrier. The opposite end of dowel 228 is received in the cone-shaped end of screw 226, providing a bearing for the screw. Upon tightening of screw 226, the cube 204 will be drawn against saw blade 56, forcing it against end 202 and rigidly holding the saw blade to the carrier 58.

An additional advantage of this construction appears when changing saw blades. If the saw blade needs changed for any reason (dull blade, wrong blade for the material to be sawed, etc.) the screw 226 need only be loosened enough to allow cube 204 and saw blade 56 to move laterally to clear dowel 228. Meanwhile, screw 226 is still retained on the other end of dowel 228 and the threaded hole opposite the blade 56, retaining the cube 204 and screw 226 in place while the new blade is inserted from the end of the tool and hooked over dowel 228. Screw 226 in the wall of cube 204 opposed to that which receives the shank of blade 56 is then tightened to clamp blade 56 to the end 202 of tool carrier 58. The dowel 228 on the tool carrier 58 cooperates with the set screw 226 to assure longitudinal alignment of cube 204 on carrier 58 and locks blade 56 to carrier 58.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A power saw comprising:
   (a) a motor having an output element rotatable about a predetermined axis;
   (b) a saw blade carrier;
   (c) means mounting said carrier for reciprocation in a path substantially parallel to said rotation axis of said motor output element to impart alternate cutting and return strokes to a blade carried thereby;
   (d) means drive connecting said output element to said carrier to reciprocate said carrier incident to rotation of said output element;
   (e) means driven by said motor output element for simultaneously moving said saw blade carrier in one direction transverse to its path of reciprocation during the carriers cutting stroke and in the opposite direction during the carriers return stroke whereby a saw blade attached to the end of said carrier follows distinct paths during its cutting and return strokes; and
   (f) means for disabling said last named means whereby pure reciprocating motion is imparted to said saw blade carrier.

2. The saw defined in claim 1 wherein said selectively operable means includes means pivotally mounting said carrier mounting means about a pivot axis transverse to the path of carrier reciprocation, and means including a drive element driven by said motor output element for oscillating said carrier mounting means about said pivot axis.

3. The saw defined in claim 2 wherein said drive element is an eccentric fixed for rotation with said motor output element, and wherein said oscillating means further includes a follower mounted in fixed relation on said carrier mounting means adjacent the path of rotation of said eccentric and means resiliently biasing said follower into engagement with said eccentric.

4. The saw defined in claim 2 wherein said optionally operable means includes interposer means positionable in the path of oscillation of said carrier mounting means to prevent its pivotal motion, and manipulative means accessible from the exterior of the saw to selectively position said interposer to active or inactive position.

5. A hand tool according to claim 2 wherein said carrier mounting means is an elongated box like member having openings at the top, bottom and ends thereof.

6. A saw according to claim 5 wherein said carrier is a rectangular element, and wherein means are provided in the box like member for reciprocably supporting said element, said means comprising spaced rectangular bushing elements at each end of the member, and lubricating recesses indented in each interior side of each bushing extending substantially through the entire length thereof.

7. A saw according to claim 6 wherein the lubricating recesses of the bushings extend to the edges thereof at the ends of the bushings facing the interior of the box like member, but terminate short of the ends of the bushings directed towards the ends of said box like member.

8. A power saw comprising:
(a) a motor having an output element rotatable about a predetermined axis;
(b) a saw blade carrier;
(c) means mounting said carrier for reciprocation in a path substantially parallel to said rotation axis of said motor output element to impart alternate cutting and return strokes to a blade carried thereby;
(d) means comprising a wobble plant mechanical movement drive connecting said output element to said carrier to reciprocate said carrier incident to rotation of said output element, said wobble plate mechanism including a wobble plate having an integral hub of substantial thickness, a crank element of a length greater than the combined thickness of said plate and hub serving as a broad based journal therefor, a ball bearing intermediate the crank element and the plate portion thereof, and a concentric needle bearing intermediate said crank element and the hub portion of the wobble plate; and
(e) means driven by said motor output element for simultaneously moving said saw blade carrier in one direction transverse to its path of reciprocation during the carriers cutting stroke and in the opposite direction during the carriers return stroke whereby a saw blade attached to the end of said carrier follows distinct paths during its cutting and return strokes.

9. A saw according to claim 8 wherein the crank element comprises a stepped shaft providing adjacent journal steps and thread means at its free end, the needle bearing cooperates with the hub portion of the wobble plate and the journal step of larger diameter, while said ball bearing is coplanar with the plate portion of the wobble plate and cooperates with the journal step of lesser diameter, said ball bearing comprises inner and outer races, and means associated with said thread means retains the inner race on the crank element, and further means attached to the wobble plate retains the outer race firmly therein, whereby the wobble plate is maintained in assembled relation with respect to the crank element.

10. A power saw having:
(a) a motor having a rotatable output element;
(b) a saw blade carrier;
(c) means mounting said carrier at one end of said motor for reciprocation in a path substantially parallel to the rotation axis of said output element to impart alternate cutting and return strokes to a blade carried thereby;
(d) means drive connecting said output element of said carrier to reciprocate said carrier incident to rotation of said output element; and
(e) means for simultaneously imparting motion to said carrier in opposite directions transverse to its path of reciprocation during the cutting and return strokes of said carrier whereby a saw blade attached to said saw blade carrier will follow distinct paths during its cutting and return strokes;
(f) said last named means including means pivotally mounting said carrier mounting means about a pivot axis transverse to the path of carrier reciprocation, means including an eccentric drive element fixed for rotation with said motor output element for oscillating said carrier mounting means about said pivot axis; a follower mounted in fixed relation on said carrier mounting means adjacent the path of rotation of said eccentric, and means resiliently biasing said follower into engagement with said eccentric.

References Cited

UNITED STATES PATENTS

| | | |
|---|---|---|
| 2,705,980 | 4/1955 | Papworth. |
| 2,775,272 | 12/1956 | Papworth. |
| 2,793,661 | 5/1957 | Olson. |
| 2,824,455 | 2/1958 | Ristow et al. _____ 74—60 |
| 3,221,192 | 11/1965 | Franklin. |

FOREIGN PATENTS 1,019,036  10/1952  France.

DONALD R. SCHRAN, Primary Examiner

U.S. Cl. X.R.

143—68